United States Patent [11] 3,627,805

[72] Inventors David Randall Thomas;
John Francis, both of Glamorgan, England
[21] Appl. No. 879,908
[22] Filed Nov. 25, 1969
[45] Patented Dec. 14, 1971
[73] Assignee Midland Silicanes Limited
Reading, Berkshire, England
[32] Priority Dec. 11, 1968
[33] Great Britain
[31] 58,846/68

[54] PREPARATION OF CYCLIC SILOXANES
6 Claims, No Drawings
[52] U.S. Cl. .................................................. 260/448.2 E
[51] Int. Cl. ................................................... C07f 7/02
[50] Field of Search ........................................... 260/448.2 E

[56] References Cited
UNITED STATES PATENTS
3,489,782  1/1970  Pruvost et al. ............... 260/448.2 E
3,493,595  2/1970  Strasser et al. ............... 260/448.2 E Primary Examiner—James E. Poer
Assistant Examiner—Werten F. W. Bellamy
Attorneys—Robert F. Fleming, Jr. and Laurence R. Hobey ABSTRACT: Hydrolyzable dimethylsilanes containing two hydrolyzable substituents per molecule are contacted with water at a temperature above 200°C. to produce high yields of low-molecular weight cyclic dimethylsiloxanes. The cyclic siloxanes are useful as fluids and as intermediates in preparing silicone rubber polymers.

PREPARATION OF CYCLIC SILOXANES

This invention relates to a method for the preparation of cyclic dimethylsiloxanes.

Cyclic dimethylsiloxanes have become established as commercially valuable materials in view of their utility in the preparation of polymeric dimethylsiloxanes. In particular, the compound hexamethylcyclotrisiloxane can be polymerized to polydimethylsiloxane liquids and gums in which the molecular weight distribution of the constituent molecules falls within a relatively narrow and. However, known methods for the preparation of cyclic dimethylsiloxanes, for example, the catalytic depolymerization of polydimethylsiloxanes, provide hexamethylcyclotrisiloxane in a relatively low yield and, hence, are not satisfactory for the manufacture of this compound on a large scale.

We have now discovered that when a dimethylsilane, containing two silicon-bonded hydrolyzable radicals or atoms, and water are contacted at high temperatures, cyclic dimethylsiloxanes can be obtained in high yield. We have further discovered that the process lends itself to the production of hexamethylcyclotrisiloxane in commercially significant yields.

Accordingly, this invention provides a process for the preparation of cyclic dimethylsiloxanes which comprises contacting at a temperature in excess of 200° C. (1) an organosilicon compound of the general formula $(CH_3)_2SiX_2$, wherein X represents a substituent which is hydrolyzable under the reaction conditions, and (2) water.

The compound (1) can 2silane containing two silicon-bonded methyl radicals and two silicon-bonded atoms or radicals which are hydrolyzable under the conditions of the reaction. Thus, for example, each X can represent a hydrogen atom, a halogen atom, preferably chlorine or bromine, an alkoxy radical, an acyloxy radical or an oxime radical. Examples of operative silicon compounds (1), therefore, include $(CH_3)^2SiBr_2$, $(CH_3)_2Si(OCH_3)_2$, $(CH_3)_2Si(OCH_3Cl$. $(CH_3)_2Si(OC_4H_9)_2$, $(CH_3)_2SiHCL$ and $(CH_3)_2Si(O\cdot OC\cdot CH_3)_2$. In view of their more general availability, the preferred silicon compounds for use in this invention are those in which X is chlorine, methoxy or ethoxy, the compound dimethyldichlorosilane being most preferred.

The process of this invention involves the reaction in the vapor phase between the organosilicon compound and water and can be carried out using any apparatus which permits the organosilicon compound and water to be contacted at the desired temperature. Thus, the reaction can be carried out in a horizontal tube or vertical coil provided with suitable feed and take off lines. Alternatively, the reaction can be carried out in a vertical reactor containing a stirred or fluidized bed of inert particulate material, for example, ground silica or alumina. In such an arrangement, the silicon compounds are introduced at the bottom of the reactor in the region of the bed of particulate material and the cyclic products recovered overhead. Any suitable method of maintaining the desired temperature in the reaction zone can be employed such as induction heating, electric heating elements or molten salt bath. Other suitable forms of apparatus for carrying out the process of this invention will be readily apparent to those skilled in the art as will various modifications and refinements to achieve optimum working conditions. Thus, the apparatus can be fitted with means for removing byproduced materials, for example, HCl for preventing the carry over of the particulate bed with the siloxane product or for recycling unreacted organosilicon compound.

Contact between the organosilicon compound (1) and the water according to this invention should take place at a temperature in excess of 200° C, if significant yields of the cyclic material are to be obtained. The optimum temperature for the reaction is in the region of 300° to 400° C. although the actual temperature employed may depend on the particular organosilicon compound (1). The process can, if desired, be carried out at higher temperatures, for example, 550° C. and above. However, the use of very high temperatures leads to inconveniently short reaction times for optimum yields of cyclic siloxane product and may also require the use of special reactor materials. The contact time for optimum yield will depend on the actual temperature employed and may, therefore, vary considerably, e.g. from 1 to 60 seconds. At a temperature of about 400° C., a contact time of about 5 to 15 seconds is preferred with correspondingly shorter or longer contact times at higher or lower temperatures.

The relative proportions of the silicon compound and water employed in the process of this invention are not narrowly critical and can be varied widely. Preferably at least sufficient water to hydrolyze all of the silicon-bonded hydrolyzable radicals is used, from 2 to 8 moles of water per mole of organosilicon compound being the most preferred range.

The products of the process of this invention normally consists of a mixture of two or more cyclic methylsiloxanes, the mixture also possibly containing unreacted silicon compound and other materials. The desired cyclic siloxanes can be removed from such a mixture by any suitable technique, for example, by fractional distillation. When the reaction gives rise to strongly acidic byproducts, these are preferably removed from the reaction product at an early stage to minimize loss of the cyclic siloxanes by polymerization. Removal of acidic byproducts can be conveniently achieved by washing the condensed or vaporous reaction products with water.

The following examples illustrate the invention.

EXAMPLE 1

The apparatus employed in this example was a mild steel, vertical stirred bed reactor having an internal diameter of 3 inches and a length of 24 inches. The reactor was heated by means of a thermostatically controlled, heated air jacket; the temperature of the reactor wall being 400° C. The bed of the reactor consisted of ground silica having a particle size of approximately 150 microns, the bed having a depth of 15 inches. Employing standard metering pumps, water and an equimolar solution of $(CH_3)_2SiCl_2$ in benzene was fed through separating lines into the reactor, at its lower end. The $(CHhd 3)_2SiCl_2$ was fed into the reactor at a rate of 2 moles per hour (approximately 420 g. per hour of solution) and the water at a rate of 8 moles per hour. Prior to entering the reactor, the chlorosilane solution and the water were vaporized.

The reaction product leaving the reactor was scrubbed with water to remove byproduced hydrochloric acid, condensed and fractionally distilled. It was found that 80 percent by weight of the $(CH_3)_2SiCl_2$ had been converted to cyclic siloxanes. Of the total cyclic siloxane content of the product, 42 percent by weight was hexamethylcyclotrisiloxane, 34 percent by weight was octamethylcyclotetrasiloxane and 17.8 percent by weight was decamethylcyclopentasiloxane.

EXAMPLE 2

The procedure of example 1 was repeated except that the reactor employed was a hollow vertical coil of mild steel, having a total length of 12 feet and internal diameter of 0.75 inches. About 80 percent by weight of the $CH_3)_2SiCl_2$ passing through the reactor was converted to cyclic siloxanes of which 48.6 percent by weight was hexamethylcyclotrisiloxane, 30 percent by weight was octamethylcyclotetrasiloxane and 15.6 percent by weight was decamethylcyclopentasiloxane.

EXAMPLE 3

The reactor employed in this experiment was a vertical, stirred bed, glass tube having an internal diameter of 1.5 inches and a length of 10 inches. The tube was maintained at a temperature of 310° C. by means of a salt bath. The bed of the reactor was of ground silica similar to that employed in example 1 and the depth of the bed was 7 inches.

Into the base of the reactor were introduced, through separate inlets and in the vaporized state, an equimolar solution of $(CH_3)_2Si(OCH_3)_2$ in benzene, at a rate of 90 g. solution per hour, and water at a rate of 2 moles per hour. The reaction product was condensed and analyzed, no aqueous wash being carried out on the product. The conversion of silane to cyclic siloxane was 30 percent and of the cyclic siloxane portion of the condensed product 45.9 percent by weight was hexamethylcyclotrisiloxane, 45.7 percent by weight was octamethylcyclotetrasiloxane and 9 percent by weight was decamethylpentasiloxane.

EXAMPLE 4

Equivalent results were realized when example 3 was repeated employing $(CH_3)_2Si(OOCCH_3)_2$, $(CH_3)_2Si(OCH_3)CL$, $(CH_3)_2SiHCl$ and $(CH_3)_2SiBr_2$ in place of the dimethyldimethoxysilane.

That which is claimed is:

1. A process for the preparation of cyclic dimethylsiloxanes which comprises contacting at a temperature in excess of 200° C. (1) an organosilicon compound of the general formula $(CH_3)_2SiX_2$, wherein X represents an atom or radical which is hydrolyzable under the reaction conditions, and (2) water.

2. A process as claimed in claim 1 wherein the organosilicon compound is dimethyldichlorosilane.

3. A process as claimed in claim 1 wherein the organosilicon compound and water are contacted at a temperature within the range from 300° to 400° C.

4. A process as claimed in claim 1 wherein from 2 to 8 moles of water are employed for every mole of the organosilicon compound.

5. A process for preparing dimethylcyclosiloxane polymers comprising contacting (1) a silane of the general formula $(CH_3)_2SiX_2$ where X is a hydrolyzable substituent, with (2) 2 to 8 moles of water per mol of silane (1) present, at a temperature in the range from 200° to 550° C.

6. The process of claim 5 wherein X is Cl, $OCH_3$ or $OOCCH_3$.

* * * * *